US006504099B2

(12) United States Patent
Huang

(10) Patent No.: US 6,504,099 B2
(45) Date of Patent: Jan. 7, 2003

(54) SAFE PROTECTING DEVICE FOR LAMP BULBS WITH PINS AND CONDUCTORS CONNECTED DIRECTLY

(75) Inventor: Peter K. H. Huang, Taipei (TW)

(73) Assignee: Shining Blick Enterprises Co., Ltd., Taipei (TW)

( * ) Notice: Subject to any disclaimer, the term of this patent is extended or adjusted under 35 U.S.C. 154(b) by 0 days.

(21) Appl. No.: 09/781,944

(22) Filed: Feb. 14, 2001

(65) Prior Publication Data

US 2002/0092665 A1 Jul. 18, 2002

(30) Foreign Application Priority Data

Jan. 15, 2001 (TW) .................................... 90200724 U

(51) Int. Cl.[7] ............................................ H02G 15/02
(52) U.S. Cl. .................... 174/74 R; 174/74 A; 439/932
(58) Field of Search ............................ 174/74 R, 74 A, 174/75 R, 77 R, 79, 84 R; 313/318.01, 318.09; 362/226; 439/932, 730

(56) References Cited

U.S. PATENT DOCUMENTS 2,813,922 A * 11/1957 Arnold .................... 174/50.52
3,541,381 A * 11/1970 Matsuya ..................... 313/318
3,946,263 A * 3/1976 Protzeller .................... 313/312
4,488,763 A * 12/1984 Ritter ........................ 339/17 F
4,631,650 A * 12/1986 Ahroni ........................ 362/249
5,165,789 A * 11/1992 Womack ..................... 362/391
5,463,270 A * 10/1995 Wakimizu et al. ..... 313/318.01
5,644,189 A * 7/1997 Busby ................... 313/318.01
6,203,392 B1 * 3/2001 Rachel et al. ................. 445/27

* cited by examiner

*Primary Examiner*—Anthony Dinkins
*Assistant Examiner*—William H. Mayo, III
(74) *Attorney, Agent, or Firm*—Troxell Law Office PLLC

(57) ABSTRACT

A safe protecting device for a lamp bulb with pins and conductors connected directly, wherein, two pins of the lamp bulb have exposed sections to be welded together with peeled and naked sections of the conductors; a protecting sheath is provided for assembling the pins of the lamp bulb and the peeled and naked sections of the conductors. The protecting sheath is injection molded to have a predetermined length and is provided with extensions on the front end portion thereof for positioning a part of the lamp bulb. A storing portion is formed behind the front end portion of the protecting sheath for storing the pins of the lamp bulb, the naked sections of the conductors and the welding spots on the front end portion; thereby, an external heat shrinking sleeve can directly contact with the welding spots when it is heat shrunk, thus safety and protecting function of the lamp bulb is strengthened.

9 Claims, 7 Drawing Sheets

SAFE PROTECTING DEVICE FOR LAMP BULBS WITH PINS AND CONDUCTORS CONNECTED DIRECTLY

BACKGROUND OF THE INVENTION

1. Field of the Invention

The present invention is related to a safe protecting device for lamp bulbs with pins and conductors connected directly, and especially to a safe protecting device capable of strengthening safety and protecting function of such style lamp bulbs.

The lamp bulbs indicated in the present invention are those lamp bulbs which are not connected to lamp holders, rather, they have their pins and conductors connected directly as decorative lamp bulbs for lightening or flashing. Such lamp bulbs are smaller, they are provided directly at the ends of the conductors, and are in the shape like crab eyes, thereby, they are called “crab-eye style lamps” in the art.

2. Description of the Prior Art

The conventional structure of such a crab-eye style lamp is made in a factory, such as is shown in FIG. 1, to have an external heat shrinking sheath 12 fixed on a joint section between a bead 10 as a lamp bulb and a conductor 11 when in assembling. The internal processing procedure in assembling further includes welding of the polar pins of the bead to the ends of the conductors 11. Then the external heat shrinking sleeve 12 is fixed by heat shrinking. The heat shrinking sleeve 12 is provided between the hard lamp bulb and the soft conductor, it is often uneven and wrinkled to make the appearance of the whole lamp very ugly. Besides, such structure of the single layered heat shrinking sleeve has a non ideal safety condition outdoors, it is very hard to pass the examination of those countries with more severe standards.

FIG. 2 shows the structural arrangement of a conventional crab-eye style lamp without an external heat shrinking sleeve, wherein, the two pins 13, 14 of the lamp bulb 10 have exposed sections 131, 141 to be welded with the peeled and naked sections 16, 17 of the conductor 11 (with the external insulation layer stripped) in addition to a lightening element 15 (such as tungsten). The welding spots 18, 19 after condensation will contain rough and sharp nodes on the surfaces thereof during mass production of such inexpensive lamp bulbs. Generally, the heat shrinking sleeve 12 is made from thin film material, when it is heat shrunk at the welding spots 18,19 with the rough and sharp surface, the heat shrinking sleeve 12 is forcedly abutted against the welding spots, this may result breakage by piercing, and thereby those countries with more severe standards do not let pass of the products of such structure for marketing at all. Surely the thickness of the heat shrinking sleeve 12 can be increased to enhance its safety, however after heat shrinking, the lamp bulb 10 and the conductor 11 connected therewith having the welding spots 18, 19 with rough and sharp surfaces can still have the probability to result piercing by direct abrading of the heat shrinking sleeve when they are pulled up or down along the axis unexpectedly.

To solve the defect, the half-finished product as shown in FIG. 2 can surely be placed in a die to injection mold an external housing to completely envelop the above stated welding spots; however, a trouble remains, that is, such processing mode may increase cost of production, and is unsuitable for mass production of such inexpensive lamp bulbs.

SUMMARY OF THE INVENTION

The object of the present invention is to provide a protecting device for lamp bulbs with pins and conductors connected directly, the device can prevent a lamp bulb from direct contact with the welding spots on the rough and sharp surface of the heat shrinking sleeve (which contacts with the conductors) after heat shrinking, this can strengthen safety and protecting function.

To obtain the above stated object, the present invention provides a preferably integrally shaped protecting sheath with extensions on the front end portion thereof for positioning of a part of a lamp bulb. The central section of the protecting sheath forms a storing portion to receive therein the pins of the lamp bulb, the conductors and the welding spots. In the preferred embodiment, the storing portion can be a hollow pipe with a hole or with a first recess and a second recess on the two lateral sides thereof respectively forming the internal storing portion.

The present invention will be apparent in its novelty and features after reading the detailed description of the preferred embodiment thereof in reference to the accompanying drawings.

DETAILED DESCRIPTION OF THE PREFERRED EMBODIMENT

Figure 3:
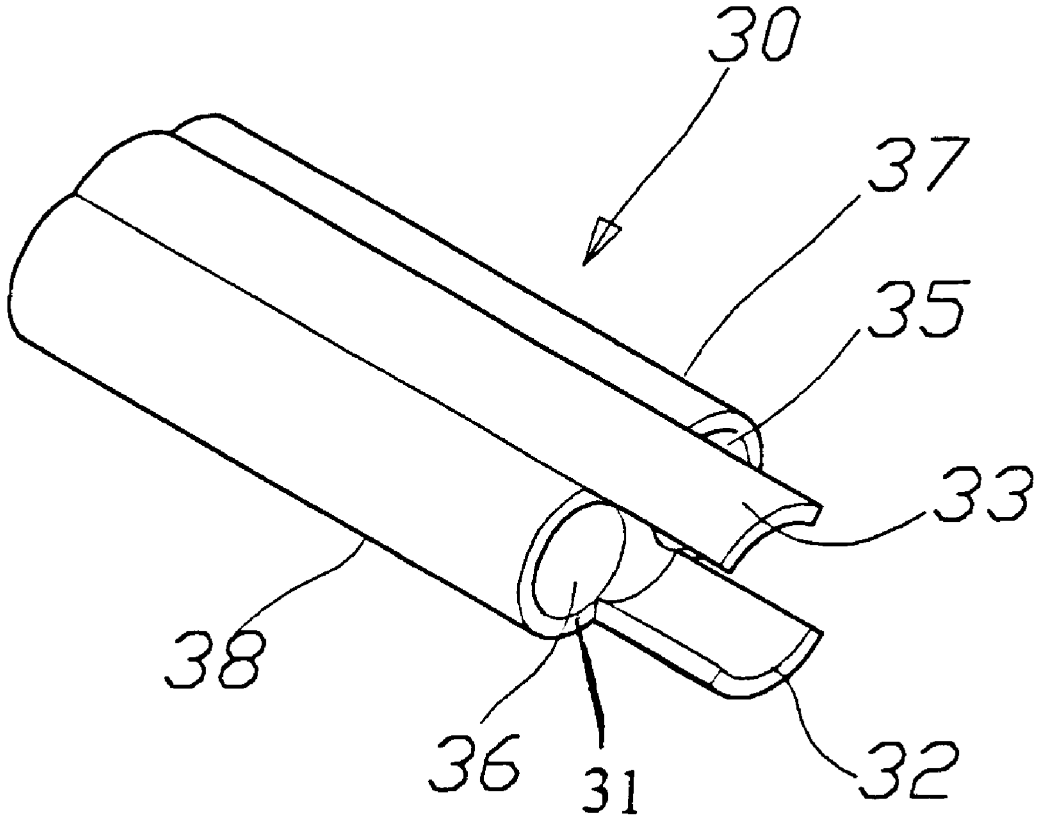
FIG. 3 is a perspective view of a first preferred embodiment of the present invention.
Figure 4:
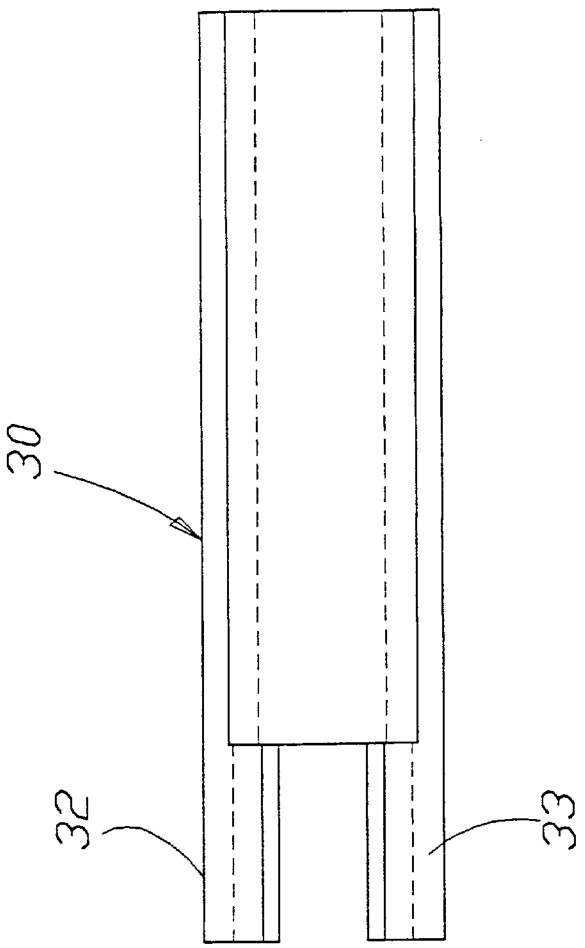
FIG. 4 is a front view of FIG. 3.
Figure 5:
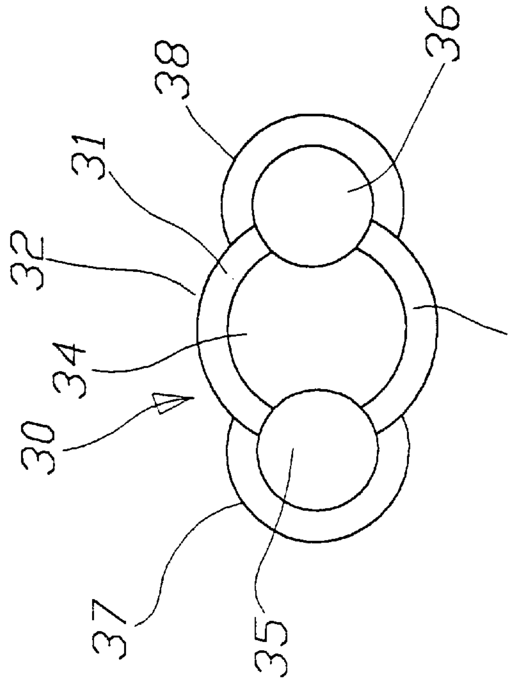
FIG. 5 is a side view of FIG. 3.

Referring to FIGS. 3–5, in the preferred embodiment of the present invention especially suiting two conductors, a protecting sheath 30 is provided and can be injection molded from non electric conductive material such as plastic to have a predetermined length, the protecting sheath 30 is provided with extensions on the front end portion 31 thereof. The front end portion 31 is separated into two tongs 32, 33. In this preferred embodiment, distance between the two tongs 32, 33 is about the diameter of the lamb bulb, the inner surfaces of the tongs 32, 33 are preferably arciform to meet the shape of the glassy external wall of the lamb bulb 15.

The primary feature of the present invention is resided in that, a storing portion is formed behind the front end portion 31 of the protecting sheath 30 for storing the pins of the lamp bulb, the naked sections of the conductors and the welding spots on the front end portion 31 of the protecting sheath 30. In this preferred embodiment, a central section 34 (referring to FIG. 5) of the protecting sheath 30 forms two hollow pipes 37, 38 with holes 35, 36.

Figure 1:
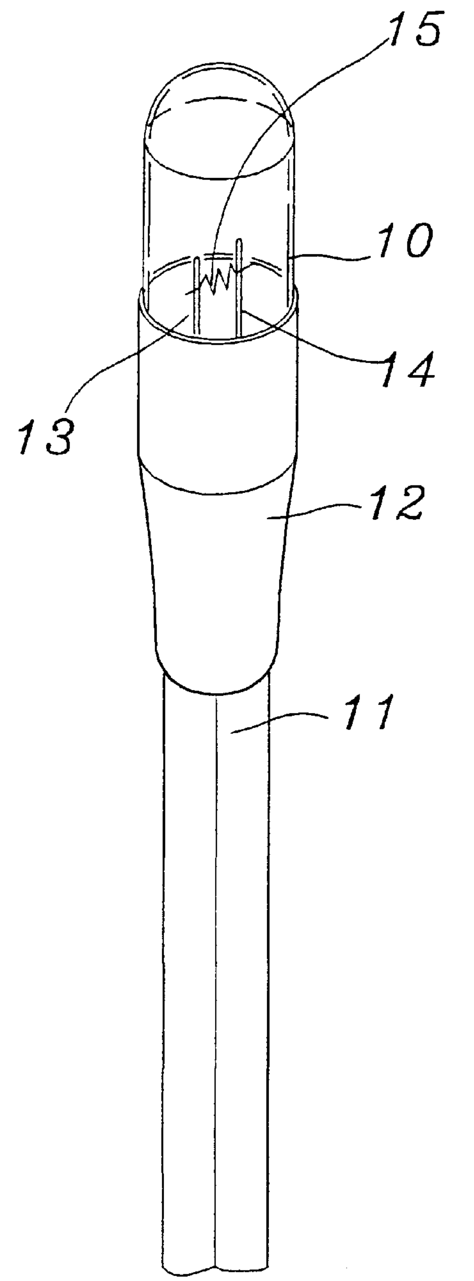
FIG. 1 PRIOR ART
FIG. 1 is a perspective view of a conventional protecting device for a lamp bulb with pins and conductors connected directly.
Figure 2:
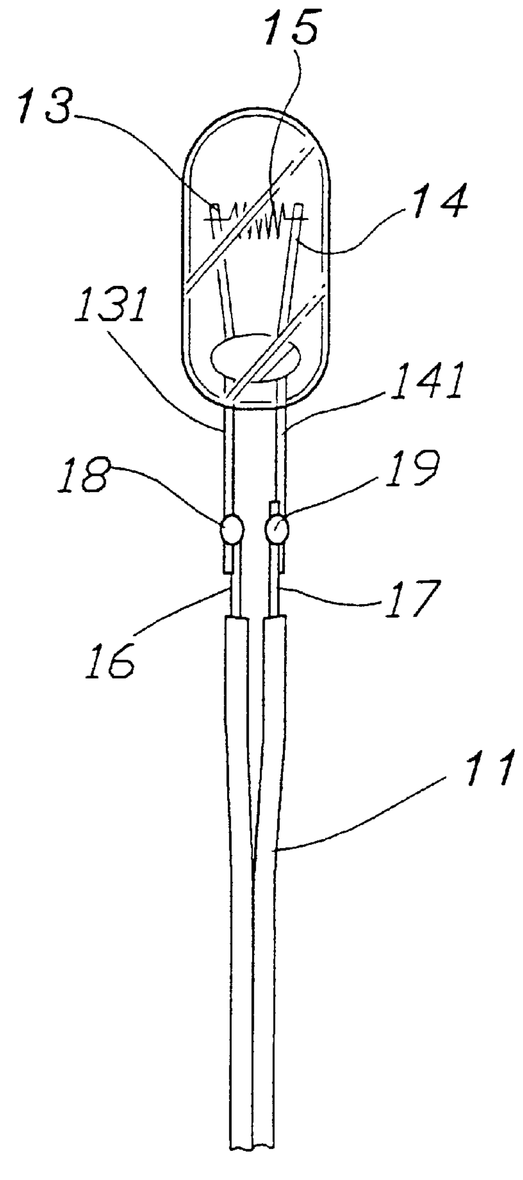
FIG. 2 PRIOR ART
FIG. 2 is a perspective view showing the structure of FIG. 1 before the heat shrinking sleeve is assembled.
Figure 6:
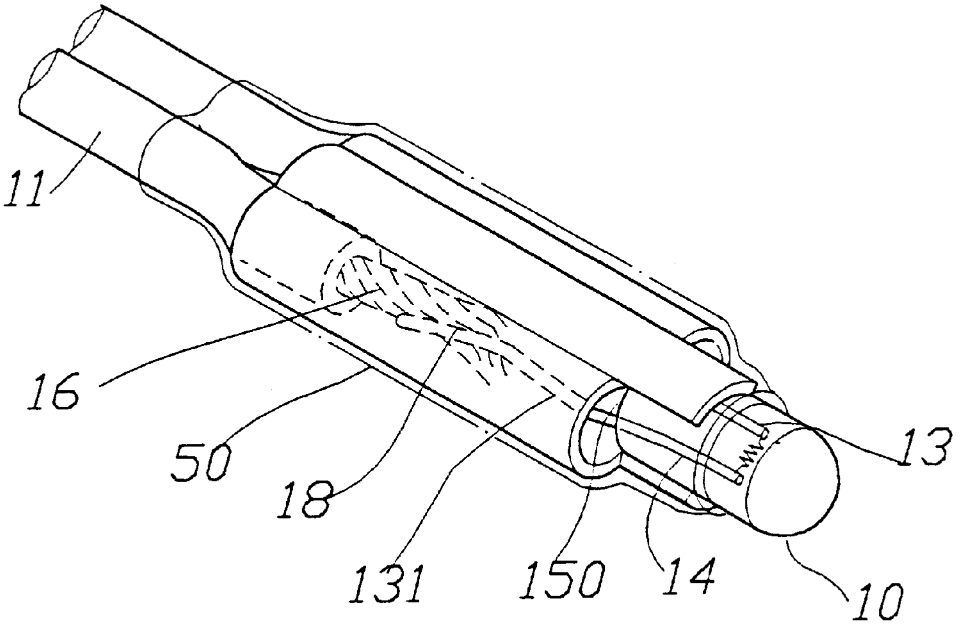
FIG. 6 is a perspective view showing the structure with the lamp bulb and the conductors of FIG. 3 connected with each other.

As shown in FIG. 6, when the half-finished product as shown in FIG. 2 is assembled in the protecting sheath 30, a part of the lamb bulb 15 can be pulled into the space between the two tongs 32, 33 to render the bottom surface 150 thereof to abut against the front end portion 31, thereby, the pins 131 of the lamp bulb 15, the naked sections of the conductors 16 and the welding spots 18 as shown are all put in the storing portion, i.e., in the holes 35, 36 of the two hollow pipes 37, 38. In this protecting state, when a heat shrinking sleeve 50 is processed with heat shrinking, it will not contact the welding spot 18 with a rough and sharp surface at all.

Figure 7:
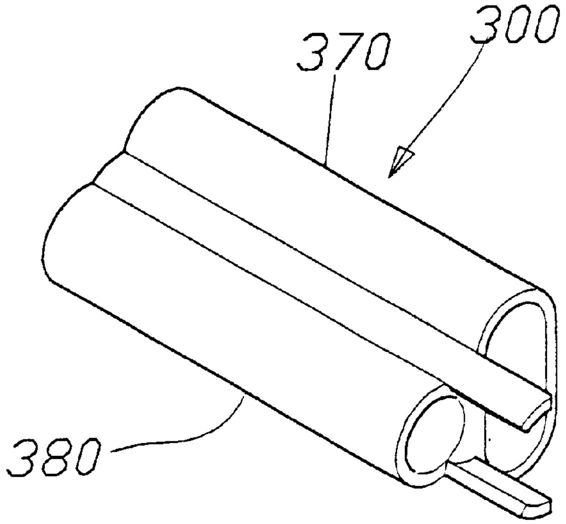
FIG. 7 is a perspective view of a second preferred embodiment of the present invention.
Figure 8:
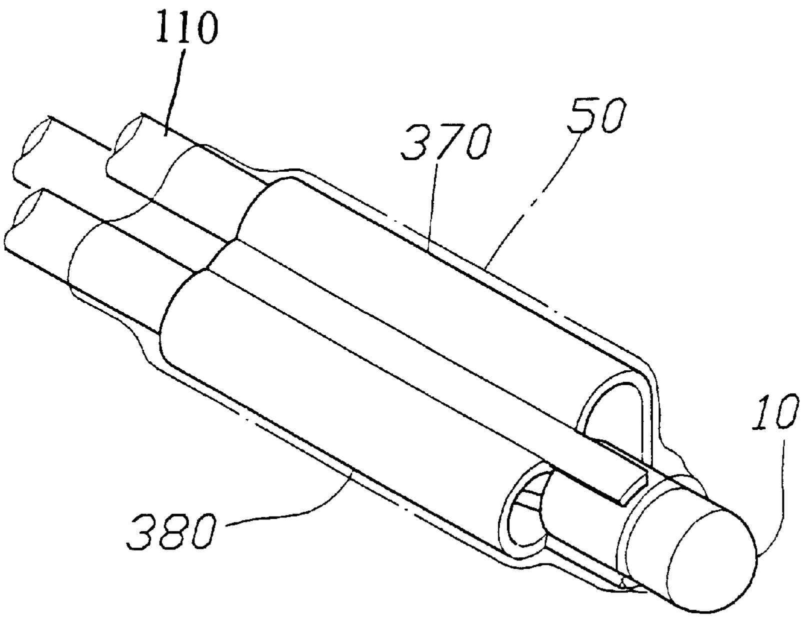
FIG. 8 is a perspective view showing the structure with the lamp bulb and the conductors of FIG. 7 connected with each other.

As shown in FIGS. 7, 8, the above stated structure can also suit a set of conductors 110 with three wires. In this preferred embodiment, a protecting sheath 300 can receive the three wires simultaneously just by enlarging one of two hollow pipes 370, 380.

Figure 9:
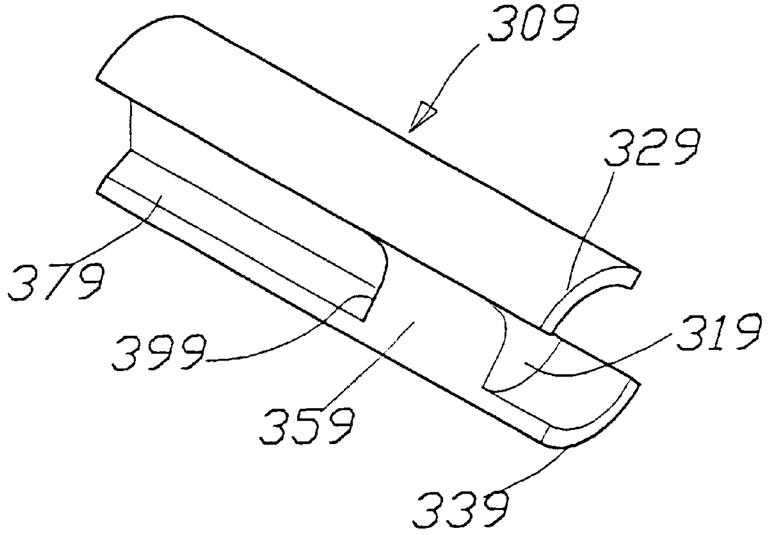
FIG. 9 is a perspective view of a third preferred embodiment of the present invention.
Figure 11:
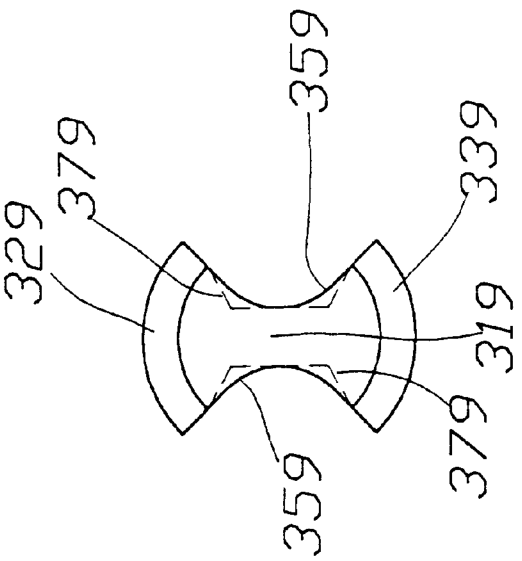
FIG. 11 is a side view of FIG. 9.
Figure 10:
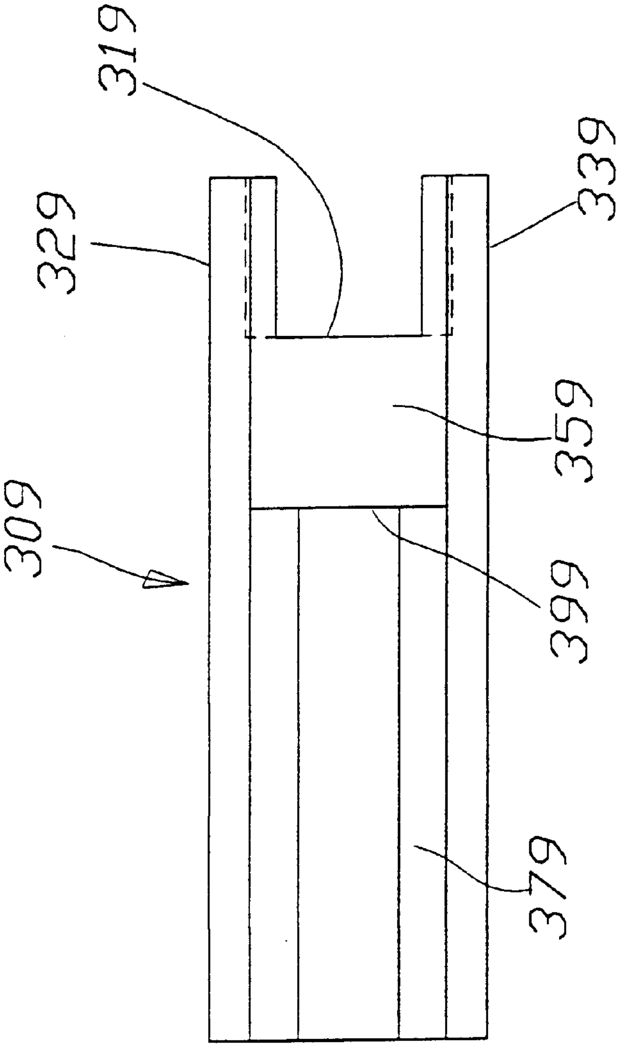
FIG. 10 is a front view of FIG. 9.
Figure 12:
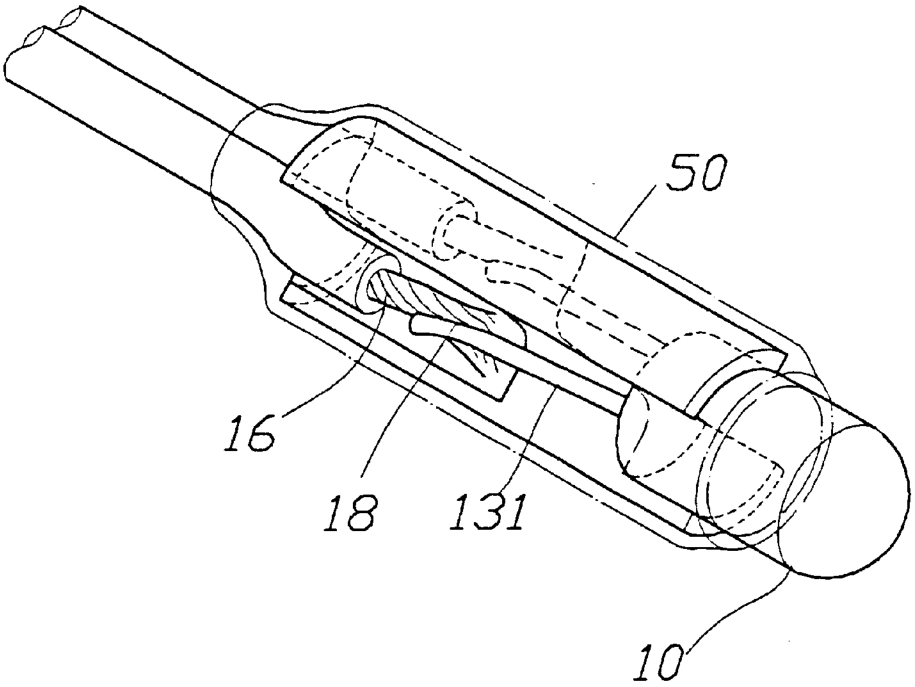
FIG. 12 is a perspective view showing the structure with the lamp bulb and the conductors of FIG. 12 connected with each other.

Referring to FIGS. 9–11 which show another embodiment, wherein, a protecting sheath 309 can also be injection molded from plastic to be similarly provided with a front end portion 319, an upper tong 329 and a lower tong 339. Behind the front end portion 319, a storing portion which is opened is provided. Two opened recesses are provided on each of the two lateral sides thereof, one is a shallower first recess 359 coincident with the length of the pins of the lamb bulb, the other is a deeper second recess 379 located behind the first recess 359. A stepped portion 399 with a set recessing depth is provided between the two. As shown in FIG. 12, when the embodiment is in the stage of assembling a half-finished product as shown in FIG. 2, the pins 131 of the lamp bulb 15 is abutted on the first recess 359, the naked sections of the conductors 16 are abutted on the second recess 379, while the welding spots 18 is contracted to be abutted on the stepped portion 399 without forced contact with the inner surface of the heat shrinking sleeve 50.

Figure 13:
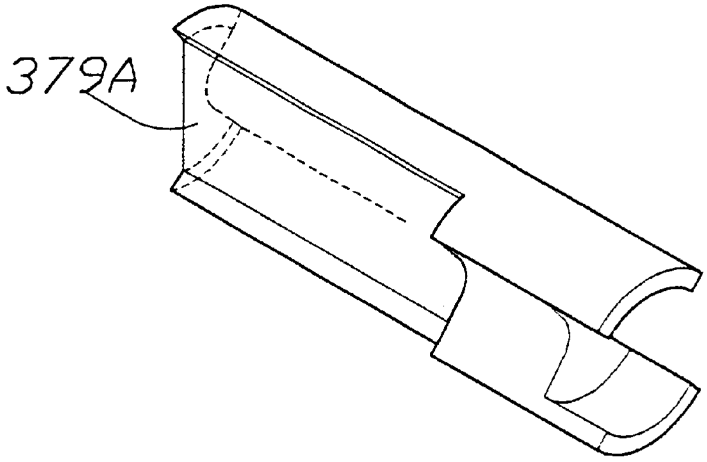
FIG. 13 is a perspective view of another preferred embodiment of the present invention.

Referring to FIG. 13 showing another embodiment which is similar to the above third embodiment, except that a second recess 379A on one side herein is enlarged to receive a set of conductors with three wires.

The above stated improved structure of the present invention can render the structure to have more even and tidy appearance when the external heat shrinking sleeve is heat shrunk by using a protecting sheath, in addition to this, the pins of the lamp bulb, the conductors and the welding spots are received in and protected by the protecting sheath, the external heat shrinking sleeve directly contacting with the welding spots with rough and sharp surfaces can avoid the defect of breakage by piercing in such contact, thereby, the conventional problem of breakage by piercing can be solved to get a higher safety standard and ideality for use.

The embodiment cited above is only for illustrating a preferred embodiment of the present invention, it will be apparent to those skilled in this art that various modifications or changes can be made to the elements of the present invention without departing from the spirit and scope of this invention. Accordingly, all such modifications and changes also fall within the scope of the appended claims and are intended to form part of this invention.

What is claimed is:

1. A protecting sheath for a lamp bulb without a base, the lamp bulb having at least two exposed pin sections extending from a bottom thereof each attached to a conductor at a welding spot, the protecting sheath comprising: an elongated, rigid plastic center section having two opposite sides and a front end; two spaced apart tongs extending outwardly from the front end, the tongs configured to contact sides of the lamp bulb; and a storing portion extending along each of the two opposite sides of the center section, the storing portions configured to receive therein the at least two exposed pins, the welding spot and the conductor.

2. The protecting sheath of claim 1 wherein each storing portion comprises first and second recesses, the second recess being deeper than the first recess.

3. The protecting sheath of claim 2 wherein the second recess on a first of the two opposite sides of the center section is larger than the second recess on a second of the two opposite sides of the center section.

4. The protecting sheath of claim 1 wherein each storing portion comprises a hollow pipe with a hole extending therethrough.

5. The protecting sheath of claim 4 wherein the hollow pipe on a first of the two opposite sides of the center section is larger than the hollow pipe on a second of the two opposite sides of the center section.

6. The protecting sheath of claim 4 wherein the hollow pipe on the two opposite sides of the center section are the same size.

7. The protecting sheath of claim 4 wherein the center section, the tongs and the hollow pipe are integrally formed by injection molding.

8. The protecting sheath of claim 1 wherein the tongs have arcuate cross-sectional configurations.

9. The protecting sheath of claim 1 wherein the center section and the tongs are integrally formed by injection molding.

* * * * *